United States Patent [19]

Iijima et al.

[11] 4,037,248
[45] July 19, 1977

[54] SYSTEM FOR CODING AND/OR DECODING COLOR TELEVISION SIGNAL INCLUDING LUMINANCE AND CHROMINANCE INFORMATION

[75] Inventors: Yukihiko Iijima; Tatsuo Ishiguro, both of Tokyo, Japan

[73] Assignee: Nippon Electric Company Limited, Tokyo, Japan

[21] Appl. No.: 661,679

[22] Filed: Feb. 26, 1976

[30] Foreign Application Priority Data

Feb. 28, 1975  Japan ................................. 50-25355

[51] Int. Cl.² .............................................. H04N 9/02
[52] U.S. Cl. ...................................................... 358/13
[58] Field of Search ........................................... 358/13

[56] References Cited

U.S. PATENT DOCUMENTS

| | | | |
|---|---|---|---|
| 3,858,240 | 12/1974 | Golding et al. | 358/13 |
| 3,921,204 | 11/1975 | Thompson | 358/13 |

Primary Examiner—John C. Martin
Attorney, Agent, or Firm—Sughrue, Rothwell, Mion, Zinn and Macpeak

[57] ABSTRACT

A system for coding a composite color television signal and a system for decoding the received coded composite color television signal are disclosed. Coding is achieved by the use of a sampling frequency lower than the Nyquist sampling frequency to provide a direct-coding system in which the composite television signal is sampled at a timing where the subcarriers stand at phases about 180° away from each other in each scanning line and at a timing where the subcarriers stand at phases about 90° away from each other between adjacent scanning lines. In the decoding system, an interspatial signal component lying at a midpoint between every two sampling points is produced from the sampled signals. A composite television signal is produced from the sample signal and the interspatial signal.

16 Claims, 9 Drawing Figures

FIG 1
|  | $A_1$ | $A_2$ | $A_3$ | $A_4$ | $A_5$ | $A_6$ | $A_7$ | $A_8$ | $A_9$ | $A_{10}$ |
|---|---|---|---|---|---|---|---|---|---|---|
| N-th SCANNING LINE | ○ | X | ○ | X | ○ | X | ○ | X | ○ | X |
|  | $B_1$ | $B_2$ | $B_3$ | $B_4$ | $B_5$ | $B_6$ | $B_7$ | $B_8$ | $B_9$ | $B_{10}$ |
| (N+1)th SCANNING LINE | X | ○ | X | ○ | X | ○ | X | ○ | X | ○ |
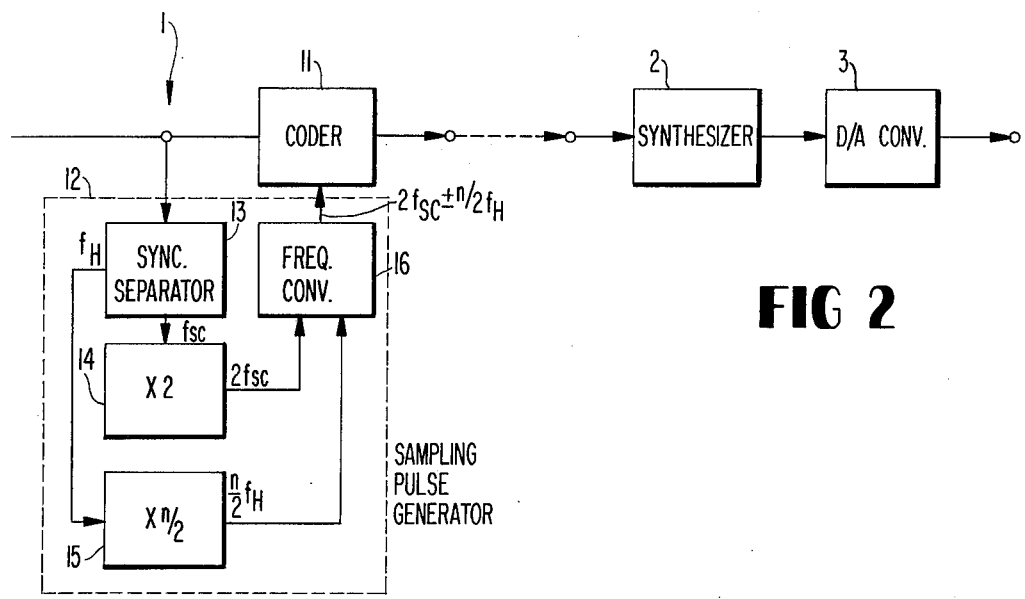
FIG 2
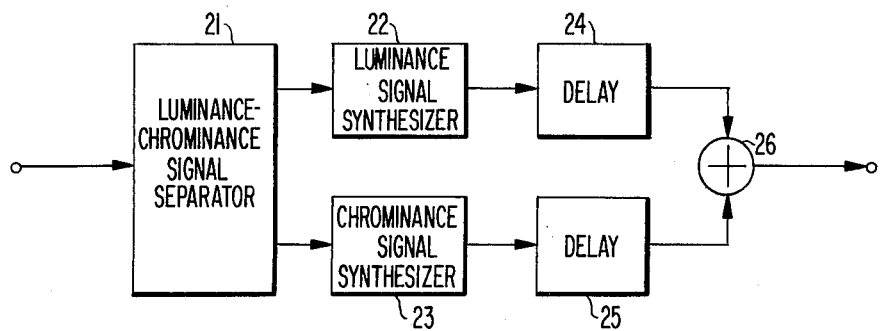
FIG 3

4,037,248

SYSTEM FOR CODING AND/OR DECODING COLOR TELEVISION SIGNAL INCLUDING LUMINANCE AND CHROMINANCE INFORMATION

BACKGROUND OF THE INVENTION

The present invention relates to a system for coding and/or decoding signal including a luminance signal and carrier chrominance signals quadrature-modulated by two chrominance signals.

The NTSC color television signal, for example, is a composite signal including a luminance signal (Y signal), and carrier chrominance signals quadrature-modulated by two chrominance signals (I and Q signals) and frequency-multiplexed at frequencies lying in the higher frequency region of the luminance signal. Prior art techniques have provided the separate-coding system for efficiently coding the composite color television signal, in which the composite signal is demodulated into baseband signals (e.g., Y signal, and I and Q signals) which are then converted into band-compressed signals and coded under the optimized coding conditions for the individual signals. The separate-coding system is efficient because of band-compression coding optimum for the individual baseband signals.

In the separate-coding system, however, the carrier chrominance signals must be demodulated and remodulated, which necessitates intricate circuit design. Furthermore, picture impairment is inevitable during modulation and demodulation of signals. Still further, the coding system needs numbers of coders, in addition to a multiplexer for multiplexing the coded signals, complicating the system construction.

As a solution to the problem, prior art techniques have resorted to the direct-coding system such as the higher-order DPCM (differential pulse code modulation) using a higher-order predictive function adapted to the composite color television signal, and the orthogonal conversion coding based on Hadamard conversion, in which the composite color television signal is coded directly without being demodulated into a baseband signal. This coding system obviates the need for demodulation and remodulation of the chrominance signal as in the separate-coding system and therefore permits system construction to be simplified.

In the direct-coding system, however, the sampling frequency must be more than twice the signal frequency band and hence has had to be as high as 9 to 11 MHz, simply because this system is to directly encode the composite color television signal. In practice, coding efficiency is lower in the direct-coding system than in the separate coding system.

SUMMARY OF THE INVENTION

It is therefore an object of the invention to provide a direct coding system capable of efficient frequency-band-compressed coding for the composite color television signal. The coding is achieved by the use of a sampling frequency lower than the Nyquist sampling frequency without the need for demodulating the composite color television signal into a baseband signal.

According to an aspect of the present invention, there is provided a direct-coding system in which a composite television signal is sampled at a timing where the subcarriers stand at phases about 180° away from each other in each scanning line and at a timing where the subcarriers stand at phases about 90° away from each other between adjacent scanning lines.

According to another aspect to the present invention, there is provided a decoding system in which an interspatial signal component lying at a midpoint between every two sampling points is produced from the sampled signals. A composite television signal is produced from the sampled signal and the interspatial signal.

Thus, according to the invention, the need for demodulation and remodulation of the chrominance component, as well as for multiplexing of luminance and chrominance signals is obviated and a constructionally simple yet highly efficient coder and decoder is realized.

BRIEF DESCRIPTION OF THE DRAWINGS

The objects, features and advantages of the invention will become more apparent from the following description when read in conjunction with the accompanying drawings, wherein:

FIG. 1 is a diagram useful for illustrating principles of the invention;

FIG. 2 is a block diagram of a first embodiment of the invention;

FIG. 3 is a block diagram showing in detail the construction of a synthesizer;

DESCRIPTION OF THE PREFERRED EMBODIMENTS

Figure 4:
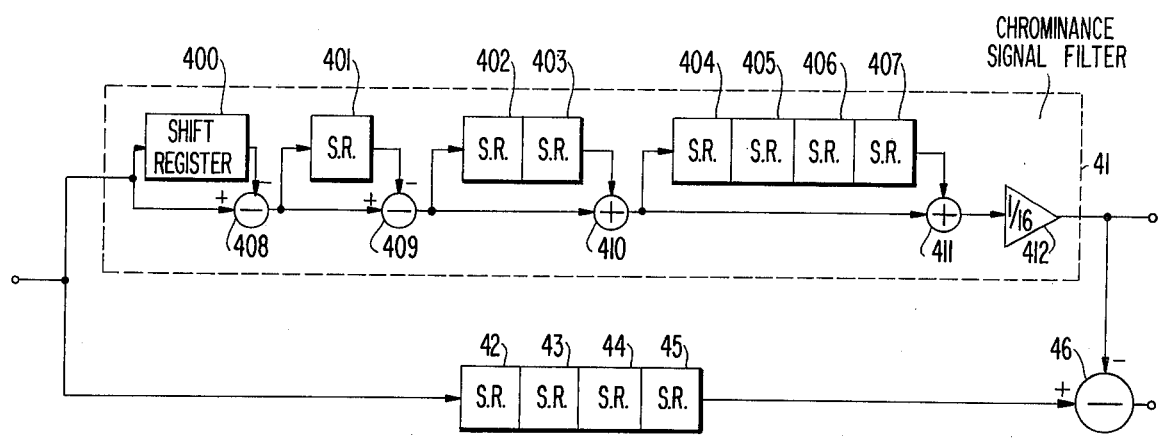
FIG. 4 is a block diagram showing in detail the construction of a circuit for separating luminannce and chrominance signals from the input signal.

Principles of the invention as applied to the NTSC color television signal will be first described. The NTSC color television signal is such that two subcarriers of the same frequency with phases 90° away from each other are amplitude-modulated by two chrominance signals, I and Q signals respectively, and the resultant signals are frequency-multiplexed at frequencies lying in the higher frequency region of the luminance signal. The subcarrier frequency $f_{sc}$ is chosen to be $455/2f_H$ (where $f_H$ is the horizontal frequency with which the subcarrier frequency has a complementary relation) in order to reduce picture impairment due to interference between the luminance signal and the carrier chrominance signals.

Assume that the NTSC color television signal is sampled at a frequency four times as high as the subcarrier frequency $f_{sc}$. FIG. 1 shows the spatial arrangement of the sampled picture elements on adjacent scanning lines within the same field. Because the sampling frequency is $4f_{sc}$, the subcarrier phase difference between two picture elements on the same scanning line is 90°, and that between two corresponding picture elements between adjacent scanning lines is 180°. In FIG. 1, when a carrier chrominance signal component $C_1$ is contained in a picture element $A_1$ on the n-th scanning line, then a carrier chrominance signal component $C_2$ with a phase 90° away from that of $C_1$ on the subcarrier vector diagram is contained in an adjacent picture element $A_2$. In the same sense, picture elements $A_3$, $A_4$, $A_5$, $A_6$, ... contain a sequence of phase-inverted carrier chrominance signal components $-C_1$, $-C_2$, $C_1$, $C_2$, ... picture elements $B_1$, $B_2$, $B_3$, $B_4$, ... on the (n+1)th scanning line contain carrier chrominance signal components $-C_1$, $-C_2$, $C_1$, $C_2$, ... with phases opposite to those of the corresponding picture elements on the n-th scanning line.

Assume that the sampling frequency is chosen to be $2f_{sc}$, the picture elements $A_1$, $A_3$, $A_5$, ... are sampled on the n-th scanning line, the picture elements $B_2$, $B_4$, $B_6$, are sampled on the (n+1)th scanning line by the sampling pulse phase-shifted by 90° from the sampling pulse for the n-th line, and these picture elements are coded for transmission. Then the carrier chrominance signal component $C_1$ is transmitted for the n-th scanning line, and $C_2$ for the (n+1)th scanning line, and this is repeated alternately. At the receiving end, the picture elements $A_2$, $A_4$, $A_6$, ... and $B_1$, $B_3$, $B_5$, ... which have not been sampled are recovered from the transmitted picture elements adjacent to those not transmitted and thus the simultaneous signal is approximately reproduced. Specifically, in FIG. 1, the picture element $B_3$ which has not been transmitted is recovered in such manner that the mean value of $B_2$ and $B_4$ is derived for the luminance signal component, and the carrier signal component of $A_3$ on the preceding scanning line is derived and phase-reversed for the carrier chrominance signal component. The resultant values of them are used as the interspatial values for the picture element $B_3$.

Briefly, according to the invention, the sampling pulse is controlled so that the picture elements are sampled at timings where the subcarriers are 90° out of phase from each other between two scanning lines, i.e., at the points indicated by o (or x) for the spatially arranged picture elements as in FIG. 1, whereby the chrominance signal components are transmitted in line-sequence. At the receiving end, the simultaneous color television signal is reproduced from the transmitted signals. Thus, the invention makes it possible to sample picture elements of a color television signal at a frequency below the Nyquist frequency and to code them for transmission without the need for demodulating the composite color television signal into the baseband signal. This signifies the fact that the sampling frequency (9 to 11 MHz) needed for conventional systems can be reduced to 7.2 MHz.

The subcarrier phase difference between scanning lines is not necessarily as exact as 90° at which sampling should occur; the sampling timing may be chosen in a range permitting normal demodulation of the carrier chrominance signal. Accordingly, the sampling frequency $f_s$ may be chosen in the range:

$$f_s = 2f_{sc} \pm n/2f_H \text{ (where } n = 0, 1, 2, ...\text{)} \quad (1)$$

Note: When $n =$ , it is necessary to switch the sampling phase by 90° at each scanning line. While, when $n = 1, 2, ...$, the sampling phase is automatically shifted by about 90° at each scanning line due to frequency offset.

With reference now to FIG. 2, a block diagram is shown to illustrate a first embodiment of the invention. A coding apparatus 1 comprises a coder 11 and a sampling pulse generator 12 for generating a sampling pulse of $f_s (=2f_{SC} \pm n/2f_H)$. The sampling pulse generator 12 includes a sync separator 13 for producing a subcarrier of $f_{sc}$ and a horizontal synchronizing signal of $f_H$, a multiplexer 14 for producing a signal of $2f_{sc}$, a divider/multiplexer 15 for producing a signal of $n/2f_H$ (for example, $\frac{1}{2}f_H$ in the first example), and a frequency converter 16 for producing a sampling pulse of $f_s = 2f_{sc} \pm n/2f_H$.

An input television signal is applied to the coder 11, and sampled and coded in response to the sampling pulse of $f_s$ from the pulse generator 12 to produce a PCM signal. As clearly understood from the above description, the picture elements indicated by o (or x) in a spatial arrangement as in FIG. 1 are sampled. In this manner the coder 11 encodes the picture elements which contain carrier chrominance signal components with phases about 90° deviated from each other on the subcarrier vector diagram between adjacent scanning lines. A sampling frequency synchronized with the scanning frequency of the television signal can readily be obtained by the use of known techniques instead of the use of the sampling pulse generator 12.

In the case where $n = 0$ in the equation (1), i.e., the sampling frequency is $f_s = 2f_{sc}$, the television signal can be coded in the following manner: The television signal is first sampled by the sampling frequency of $4f_{sc}$; then, the sampled picture elements are picked up every other sampling point, and the picking up phase is changed for every scanning line.

The composite color television signal converted into a PCM signal of sampling frequency $f_s$ is transmitted over a transmission line.

At the receiving end, the transmitted PCM signal is supplied to a synthesizer 2 as in FIG. 2. The synthesizer 2 produces from the given PCM signal of sampling frequency $f_s$ a signal with the subcarrier phases of 90° away from each other, by synthesizing the sampled signals for the spatially adjacent picture elements, and thus providing a PCM signal of sampling frequency $2f_s$. This PCM signal is supplied to a D/A converter 3 in which it is converted into an analog composite color television signal.

With reference to FIG. 3, there is shown an example of the synthesizer 2 of FIG. 2. The PCM signal of sampling frequency $f_s$ is supplied to a luminance-chrominance signal separator 21 in which it is separated into a luminance signal component on the side of lower band of the PCM signal, and a carrier chrominance signal component in the neighborhood of the subcarrier frequency $f_{sc}$. The luminance signal component is supplied to a luminance signal synthesizer 22, and the carrier chrominance signal component to a chrominance signal synthesizer 23. The synthesizer 22 produces an interspatial luminance signal for the interspatial picture element between the sampled elements from the luminance signal components of the coded signals. Then, the interspatial luminance signal is synthesized into the luminance signal component of the coded signal, whereby a luminance PCM signal with the sampling frequency $2f_s$ is obtained. The synthesizer 23 produces an interspatial chrominance signal for the interspatial picture element by phase reversing the chrominance component of the coded signal for the corresponding picture element in the previous scanning line. Then, the interspatial chrominance signal is synthesized into the chrominance component of the coded signal, whereby a carrier chrominance PCM signal with sampling frequency $2f_s$ is obtained.

The luminance and carrier chrominance PCM signals are supplied to a luminance and chrominance signal delay circuit 24 and 25, respectively. These signals are corrected for delays taken in the individual synthesizers, and the resultant signals are supplied to an adder 26, in which the two signals are added to obtain a composite color television signal in PCM form at a sampling frequency of $2f_s$.

As described above, the synthesizer 2 produces a PCM signal in the form of simultaneous signal of sampling frequency $2f_s$ from the line-sequentially transmitted PCM signal of sampling frequency $f_s$.

FIG. 4 shows in block form an example of luminance-chrominance separator 21 as in FIG. 3. A chrominance signal separation filter 41 extracts from a transmitted PCM signal of sampling frequency $f_s$ the carrier chrominance signal component near the frequency $f_{sc}$. The filter characteristic of this filter in terms of Z-conversion is given as $$H(Z) = (1/16)(1 - Z^{-1})^2(1 + Z^{-2})(1 + Z^{+2})(1 + Z^{-4}) \quad (2)$$

Then the frequency characteristic $H(f)$ is expressed by $$H(f) = [\sin(\pi f/f_s)]^2 \cdot \cos(2\pi f/f_s) \cdot \cos(4\pi f/f_s) \quad (3)$$

Equation (3) signifies that the filter 41 passes only the signal component in the vicinity of $\frac{1}{2}f_s$. Since $f_s \simeq 2f_{sc}$, only the carrier chrominance signal component comes out at the output of the filter 41. In this embodiment, the filter characteristic H(Z) of Eq. (2) is realized with a nonrecursive type digital filter. The filter 41 is constructed of shift registers 400 to 407 which are operated at a clock frequency $f_s$, subtractors 408 and 409, adders 410 and 411, and a multiplier 412 with a multiplying factor of 1/16. The function of the multiplier 412 is simply to shift an input signal down by four digits.

An input signal to the luminance-chrominance signal separation filter 41 is applied to the shift register 400 and the subtractor 408. The subtractor 408 substracts from this input signal the output of the shift register 400 (the input signal delayed by one-sampling period). In other words, the output of the subrractor 408 results from the input signal computed for the transfer function $1 - Z^{-1}$. The subtractor output is supplied to the shift register 401 and the subtractor 409. The subtractor 409 computes the output of the subtractor 408 for the transfer function $1 - Z^{-1}$. The output of the subtractor 409 is supplied to the adder 410 and the shift register 402. The shift registers 402 and 403 delay the input signal to the shift register 402 by one sampling period respectively, to produce a signal delayed by two sampling periods. The adder 410 adds up the outputs of the subtractor 409 and shift register 403. The output of the adder 410 results from the output of the subtractor 409 computed for the transfer function $1 + Z^{-2}$. The output of the adder 410 is supplied to the adder 411 and the shift register 404. The shift registers 404, 405, 406 and 407 delay the input signal to the shift register 404 by one sampling period, causing the shift register 407 to provide a signal delayed by four sampling periods. The adder 411 adds up the outputs of the adder 410 and shift register 407. The output of the adder 411 results from the output of the adder 410 computed for the transfer function $1 + Z^{-4}$. The output of the adder 411 is supplied to the multiplier 412 in which it is multiplied by a multiplying factor of 1/16.

In other words, the chrominance signal separation filter 41 performs operation on the input signal for the transfer function $(1/16)(1 - Z^{-1})^2 \cdot (1 + Z^{-2})(1 + Z^{-4})$ whereby the carrier chrominance signal component is separated. The reason the multiplier 412 multiplies the signal by a multiplying factor of 1/16 is to operate the filter with a gain of 1.

The luminance signal component can be extracted by subtracting the carrier chrominance signal component from the input signal. In FIG. 4, shift registers 42 to 45 operate at a clock frequency $f_s$, and the output of the shift register 45 is a signal delayed behind the input signal to the shift register 42 by four sampling periods. The delayed signal is supplied to a subtractor 46, which provides the luminance signal component by subtracting the output of the chrominance signal separation filter 41 from the output of the shift register 45. The shift registers 42 to 45 are a delay element for correcting the time delay taken by the filter 41.

The luminance-chrominance signal separation circuit 21 can be constructed of a simple digital logic circuit.

Figure 5:
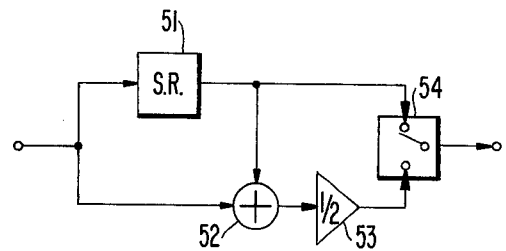
FIG. 5 is a block diagram showing in detail the construction of a luminance signal synthesizer.

FIG. 5 shows in block form an example of luminance signal synthesizer 22 as in FIG. 3. The luminance signal from the separator 21 is supplied to a shift register 51 and an adder 52. The shift register 51 operates at a clock frequency $f_s$ to generate an output delayed by one sampling period. The adder 52 adds up the input signal and the output of the shift register 51 and supplies the sum to a multiplier 53 in which the signal is multiplied by a multiplying factor of ½ (for example, input PCM signal is shifted down by one digit). Thus, an interspatial luminance signal with a mean value of two adjacent luminance PCM signals is obtained at the output of the multiplier 53. The interspatial signal is supplied to a switch 54, which is also supplied with the luminance signal from the shift register 51. The switch 54 alternately selects the coded luminance PCM signal from the shift register 51 and the interspatial luminance PCM signal from the multiplier 53, whereby a luminance PCM signal of clock frequency $2f_s$ is obtained.

Figure 6:
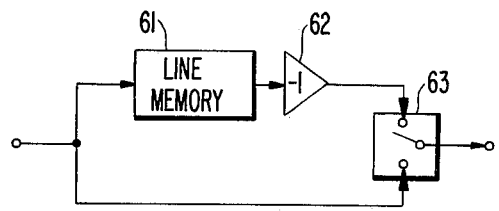
FIG. 6 is a block diagram showing in detail the construction of a chrominance signal synthesizer.

Referring to FIG. 6, there is shown in block form an example of the chrominance signal synthesizer 23 of FIG. 3. The carrier chrominance PCM signal of sampling frequency $f_s$ is supplied from the chrominance signal separator 21 to a line memory 61 and a switch 63. The line memory 61 provides the signal with a delay of one scanning line period and may be constructed of a memory element such as shift register. Since the subcarrier is phase-inverted at each scanning line, the output of the line memory 61 is multiplied by a factor of $-1$ (i.e., phase-inverted) in a multiplier 62 and then supplied to a switch 63. The switch 63 operates like the switch 54 of FIG. 5 in such manner that the carrier chrominance PCM signal delayed by one scanning line, with the phase inverted, is interleaved into the midpoint of signals sampled, whereby the carrier chrominance PCM signal of sampling frequency $2f_s$ is obtained.

According to the invention, therefore, the chrominance signal synthesizer 23 generates a chrominance signal of $2f_s$ alternately having two carrier chrominance components in a time sequence by interleaving one of the carrier chrominance signals line-sequentially transmitted, with the phase 90° away from each other between the individual scanning lines.

Figure 7:
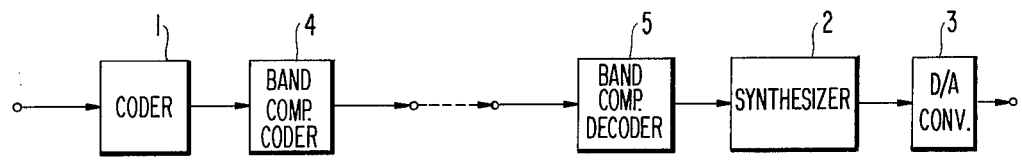
FIG. 7 is a block diagram showing the construction of a second embodiment of the invention.

With reference to FIG. 7, there is shown in block form a second embodiment of the invention. This embodiment associates a band compression coding system with the first embodiment of the invention, comprising the coding apparatus 1, the synthesizer 2 and the D/A converter 3. A band compression coding circuit 4 operates on the principle of DPCM (differential pulse code modulation), Hadamard conversion or the like whereby the PCM signal from the coding apparatus 1 is coded into a band-compressed signal. The coded signal is transmitted over a transmission line. A band-compression decoding circuit 5 decodes the transmitted signal. The decoded signal undergoes synthesizing process in the synthesizer 2 and then is converted into an analog signal in the D/A converter 3.

Figure 8:
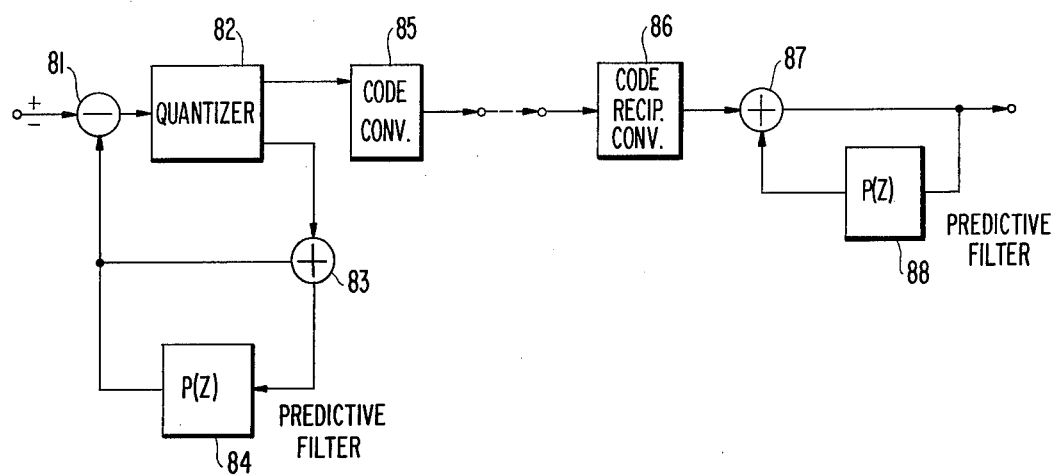
FIG. 8 is a block diagram showing the construction of a higher-order DPCM coder and decoder.

FIG. 8 shows in block form an example of the band-compression coding circuit 4 and band-compression decoding circuit 5 of FIG. 7. This embodiment relates to the band-compression coding system using higher-order DPCM based on a higer-order predictive function applied to the composite color television signal containing subcarriers. In higher-order DPCM, the predictive function P(Z) is expected to serve for the purpose of efficiently predicting both the luminance and carrier chrominance signal components. The predictive function P(Z) may be given as follows when the sampling frequency is selected to be $f_s \simeq 2f_{sc}$.

$$P(Z) = \alpha Z^{-1} = \beta Z^{-2} + \alpha \beta Z^{-3} \qquad (4)$$

where $\alpha$ and $\beta$ are constants determined, for example, as $\alpha = 0.5, \beta = 1 - 2^{-N}$ (N: a positive integer).

The higher-order DPCM coder consists essentially of a subtractor 81, a quantizer 82, an adder 83, a predicitive filter 84 and a coder converter 85. The higher-order DPCM decoder consists essentially of a code reciprocal converter 86, an adder 87 and a predictive filter 88.

An input signal to the higher-order DPCM coder is supplied to the subtractor 81, which provides a predictive error by subtracting from the input signal the predictive signal which is the output of the predictive filter 88. The predictive error is supplied to the quantizer 82 in which the predictive error signal is quantized in a predetermined quantizing characteristic. The quantized signal is supplied to the adder 83 and the code converter 85. The adder 83 adds up the quantized signal from the quantizer 82 and the output signal from the predictive filter 88. The resultant signal, i.e., a locally decoded signal, is supplied to the predictive filter 84. Having the transfer characteristics as in Eq. (4), the predictive filter 84 computes the predictive value of the subsequent sampling timing according to the locally decoded signal and generates a predictive signal. The code converter 85 converts the quantized signal from the quantizer 82 into a code corresponding to the quantizing level and transmits it over a transmission line.

In the higher-order DPCM decoder, the code reciproeal converter 86 converts the transmitted signal into a signal corresponding to the level of the quantized signal of the quantizer 82. The adder 87 adds up the output from the code reciprocal converter 86 and the predictive signal from the predictive filter 88 and generates a decoded signal. The decoded signal is supplied to the predictive filter 88 in which a predictive signal of the subsequent sampling time is generated. The two predictive filters 84 and 88 have the same transfer characteristic.

Figure 9:
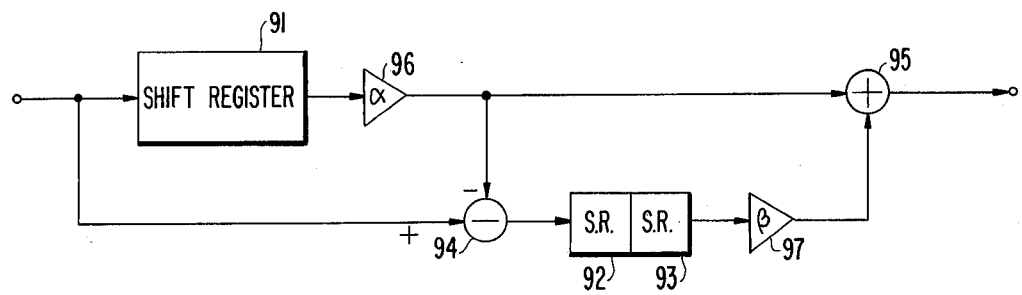
FIG. 9 is a block diagram showing in concrete the construction of a predictive filter.

FIG. 9 shows in block form an example of the predictive filters 84 and 88 of FIG. 8. In this embodiment, the function P(Z) given by Eq. (4) is realized by a nonrecursive type digital filter. This circuit comprises shift registers 91, 92 and 93 operated at a clock frequency $f_s$, a subtractor 94, an adder 95, and multipliers 96 and 97 with multiplying factors $\alpha$ (= 0.5) and $\beta$ (= 1 − $2^{-N}$). The multiplier 96 is only to shift down the input signal by one digit. The multiplier 97 is to subtract from the input signal a signal resulting from shifting down the input signal by N digits. These constituent components operate in the same manner as those of the chrominance signal separation filter 41 shown in FIG. 4.

According to the first embodiment of the invention, as described above, a coder and decoder circuit capable of wide band compression coding can be realized by incorporating the band compression coding system into a coder and decoder in which color television signals are sampled at a frequency lower than the Nyquist frequency. Furthermore, the system of the invention obviates the need for demodulating the composite color television signal into a baseband signal and permits post-coding processing of signals to be made with high accuracy by the use of digital logic circuits.

The invention is not limited to what is described in its first embodiment as to the construction of the luminance-chrominance signal separation circuit 21, luminance signal synthesizer 22 and chrominance signal synthesizer 23 and to the transfer characteristics of the filter used in the chrominance signal separation circuit 21.

The invention is not limited to higher-order DPCM in the band-compression coding system described in the second embodiment; instead, the orthogonal conversion coding system based on Hadamard conversion or the interframe coding system or the like may be used.

In the second embodiment, the operation of higher-order DPCM coding by a digital system after A/D conversion has been described. The second embodiment may be modified, for example, in such manner that an A/D converter is used in place of the quantizer 82 of FIG. 8 where the A/D converter is operated at a sampling frequency controlled as in the coder 1 of FIG. 7, and the output of the predictive filter is converted into an analog predictive signal by a D/A converter, and the subtractor 81 is constituted of an analog subtractor circuit capable of deriving the difference between the analog input signal and the analog predictive signal.

While the described embodiments represent the preferred form of the invention, it is to be understood that modifications and variations will occur to those skilled in the art without departing from the true spirit of the invention.

What is claimed is:

1. A system for coding a composite color television signal including a luminance signal and carrier chrominance signals, said carrier chrominance signals being formed by modulating a subcarrier wave by chrominance information, the subcarrier frequency of said subcarrier wave being m/2 (m stands for an odd number) of the horizontal scanning frequency of said television signal, the phases of said subcarrier waves between two adjacent scanning periods being 180° away from each other, said coding system comprising:
   means for producing sampling pulses of a repetition frequency lower than the Nyquist frequency of said television signal;
   means for sampling and coding said television signal in response to said sampling pulses; and
   means for controlling said sampling pulses in such manner that the samples of said television signal are taken at points about 180° of said subcarrier wave away from each other in each scanning line and also about 90° of said subcarrier wave away from the samples taken in adjacent scanning lines.

2. A system for decoding a coded television signal supplied through a transmission line from the coding system as claimed in claim 1, said decoding system comprising:
 means for producing from said coded television signal coded luminance signal components and coded carrier chrominance signal components;
 means for producing from said coded luminance signal components for sampled picture elements interspatial luminance signal components for unsampled picture elements lying between said sampled picture elements;
 means for synthesizing said coded luminance signal components and said interspatial luminance signal components to provide output luminance signals;
 means for producing interspatial carrier-chrominance signal components for said unsampled picture elements by phase-reversing said carrier chrominance signal components for corresponding picture elements in a scanning line other than those where said unsampled picture elements lie;
 means for synthesizing said coded carrier-chrominance signal components and said interspatial carrier chrominance signal components to provide output carrier chrominance signals; and
 means for providing the composite television signals from said output luminance and carrier chrominance signals.

3. A system for coding as recited in claim 1, wherein said color television signal is applied to both said means for producing sampling pulses and said means for sampling and coding, and wherein said means for producing sampling pulses comprises:
 a sync separator receiving said color television signal and producing a subcarrier $f_{sc}$ and a horizontal synchronizing signal $f_H$;
 means connected to receive said subcarrier $f_{sc}$ from said sync separator for producing a signal $2f_{sc}$;
 means connected to receive said horizontal synchronizing signal $f_H$ from said sync separator for producing a signal $(n/2)f_H$; and
 means for combining said signal $2f_{sc}$ and said signal $(n/2)f_H$ to produce said sampling pulses.

4. A system for coding as recited in claim 3, wherein said means for controlling said sampling pulses includes said means for combining said signal $2f_{sc}$ and said signal $(n/2)f_H$, said means for controlling causing said signal $2f_{sc}$ and said signal $(n/2)f_H$ to be combined to produce sampling pulses $f_s$ according to the relationship:

$$f_s = 2f_{sc} \pm (n/2)f_H.$$

5. A system for decoding as recited in claim 2, wherein said means for producing coded luminance signal components and coded carrier chrominance signal components comprises:
 filter means for separating said chrominance signal component from the composite coded television signal, said filter means having the frequency characteristic H (f) expressed by $$H(f) = [\sin (\pi f/f_s)]^2 \cos (2\pi f/f_s) \cos (4\pi f/f_s);$$

delay means for delaying the composite coded television signal for a period of time equal to the time delay of said filter means; and
 subtractor means for subtracting the output of said filter means from the output of said delay means to produce said coded luminance signal components.

6. A system for decoding as recited in claim 5, wherein said filter means is a digital filter having a filter characteristic given in terms of the Z-conversion as $$H(Z) = (1/16)(1 - Z^{-1})^2(1 + Z^{-4}) (1 + Z^{-2})$$

said digital filter comprising:
 a first shift register stage connected to receive said coded composite television signal;
 a first subtraction means for subtracting the output of said first shift register from said coded composite television signal;
 a second shift register stage connected to receive the output of said first subtraction means;
 second subtraction means for subtracting the output of said second shift register stage from the output of said first subtraction means;
 third and fourth shift register stages connected in cascade, said third shift register stage being connected to receive the output of said second subtraction means;
 first addition means for adding the output of said fourth shift register stage to the output of said second subtraction means;
 fifth, sixth, seventh and eighth shift register stages connected to cascade, said fifth register stage being connected to receive the output of said first addition means;
 second addition means for adding the output of said eighth shift register stage to the output of said first addition means; and
 multiplying means for multiplying the output of said second addition means by 1/16th.

7. A system for decoding as recited in claim 2, wherein said means for producing interspatial luminance signal components for unsampled picture elements comprises:
 a shift register connected to receive said coded luminance signal components to generate an output delayed by one sampling period;
 addition means for adding the output of said shift register to said coded luminance signal components; and
 multiplying means for multiplying the output of said addition means by a factor of ½.

8. A system for decoding as recited in claim 7, wherein said means for synthesizing said coded luminance signal components and said interspatial luminance signal components comprises a switch means connected to receive the output of said shift register and the output of said multipying means for alternately selecting the coded luminance signal from said shift register and the interspatial luminance signal from said multiplying means.

9. A system for decoding as recited in claim 2, wherein said means for producing interspatial carrier-chrominance signal components for said unsampled picture elements comprises:
 a line memory connected to receive said coded carrier chrominance signal components to provide a delay of one scanning line period; and
 multiplying means for multiplying the output of said line memory by a factor of $-1$.

10. A system for decoding as recited in claim 9, wherein said means for synthesizing said coded carrier-chrominance signal components and said interspatial carrier chrominance signal components comprises switch means for alternately selecting said coded carrier-chrominance signal components from said means for producing from said coded television signal said coded carrier chrominance signal components and the interspatial carrier chrominance signal components from said multiplying means.

11. A system for coding as recited in claim 1, further comprising band compression coding means connected to receive the output of said means for sampling and coding for producing a band-compressed signal.

12. A system for coding as recited in claim 11, wherein said band-compression coding means operates on the principle of differential pulse code modulation and comprises:
   subtraction means for subtracting an input signal from the output of said means for sampling and coding;
   quantizer means for receiving the output of said subtraction means and generating a quantized signal according to a predetermined quantizing characteristic;
   adding means for adding an input signal to the quantized signal from said quantizing means; and
   a predictive filter having a predictive function P(Z) given as $$P(Z) = \alpha Z^{-1} + \beta Z^{-2} - \alpha\beta Z^{-3}$$

where $\alpha$ and $\beta$ are predetermined constants, said predictive filter receiving as its input the output of said addition means and the output of said predictive filter being connected as inputs to both said subtraction means and said addition means.

13. A system for coding as recited in claim 12, wherein said predictive filter comprises:
   a first shift register for receiving the input to said predictive filter to generate an output delayed by one sampling period;
   first multiplying means for multiplying the output of said first shift register by said predetermined constant $\alpha$;
   subtraction means for subtracting the output of said first multiplying means from the input of said predictive filter;
   second and third shift registers connected in cascade, the output of said subtraction means being connected to the input of said second shift register;
   second multiplying means for multiplying the output of said third register by said predetermined constant $\beta$; and
   addition means for adding the outputs of said first and second multiplying means.

14. A system for decoding a coded television signal supplied through a transmission line from the coding system as claimed in claim 12, said decoding system comprising:
   band-compression decoding means for decoding the band-compressed transmitted signal to produce said coded television signal;
   means for producing from said coded television signal coded luminance signal components and coded carrier chrominance signal components;
   means for producing from said coded luminance signal components for sampled picture elements interspatial luminance signal components for unsampled picture elements lying between said sampled picture elements;
   means for synthesizing said coded luminance signal components and said interspatial luminance signal components to provide output luminance signals;
   means for producing interspatial carrier-chrominance signal components for said unsampled picture elements by phase-reversing said carrier chrominance signal components for corresponding picture elements in a scanning line other than those where said unsampled picture elements lie;
   means for synthesizing said coded carrier chrominance signal components and said interspatial carrier chrominance signal components to provide output carrier chrominance signals; and
   means for providing the composite television signals from said output luminance and carrier chrominance signals.

15. A system for decoding as recited in claim 14, wherein said band-compression decoding means comprises:
   adding means for adding an input signal to said band-compression coded signal; and
   a predictive filter having the predictive function P(Z) given as $$P(Z) = \alpha Z^{-1} + \beta Z^{-2} - \alpha\beta Z^{-3}$$

where $\alpha$ and $\beta$ are predetermined constants, the input of said filter being connected to receive the output of said addition means and the output of said filter being connected as an input to said addition means.

16. A system for decoding as recited in claim 15, wherein said predictive filter comprises:
   a first shift register for receiving the input to said predictive filter to generate an output delayed by one sampling period;
   first multiplying means for multiplying the output of said first shift register by said predetermined constant $\alpha$;
   subtraction means for subtracting the output of said first multiplying means from the input of said predictive filter;
   second and third shift registers connected in cascade, the output of said subtraction means being connected to the input of said second shift register;
   second multiplying means for multiplying the output of said third shift register by said predetermined constant $\beta$; and
   addition means for adding the outputs of said first and second multiplying means.

* * * * *

UNITED STATES PATENT AND TRADEMARK OFFICE
CERTIFICATE OF CORRECTION

PATENT NO. : 4,037,248
DATED : July 19, 1977
INVENTOR(S) : Yukihiko Iijima et al It is certified that error appears in the above-identified patent and that said Letters Patent are hereby corrected as shown below:

IN THE SPECIFICATION:

Col. 3, line 56, after "=" insert --0--.

Col. 5, line 17, delete equation (2) and insert therefor

--$H(Z) = \frac{1}{16} (1-Z^{-1})^2 (1+Z^{-2})(1+Z^{-4})$--.

Col. 5, line 39, delete "subrractor" and insert therefor --subtractor--.

col. 7, line 20, delete equation (4) and insert therefor

--$P(Z) = \alpha Z^{-1} + \beta Z^{-2} - \alpha\beta Z^{-3}$--.

Col. 7, line 27, delete "coder" and insert therefor --code--.

IN THE CLAIMS:

Claim 5, column 9, line 61, after the portion of the equation reading "(4 $\pi f/f_s$" insert --)--.

UNITED STATES PATENT AND TRADEMARK OFFICE
CERTIFICATE OF CORRECTION

PATENT NO. : 4,037,248
DATED : July 19, 1977
INVENTOR(S) : Yukihiko Iijima et al It is certified that error appears in the above-identified patent and that said Letters Patent are hereby corrected as shown below:

Claim 6, column 10, line 4, delete the equation and insert therefor -- $H(Z) = \frac{1}{16} (1-Z^{-1})^2 (1+Z^{-2}) (1+Z^{-4})$ --.

Claim 6, column 10, line 25, delete "to" and insert therefor --in--.

Signed and Sealed this

Sixth Day of December 1977

[SEAL]

Attest:

RUTH C. MASON
Attesting Officer

LUTRELLE F. PARKER
Acting Commissioner of Patents and Trademarks